April 7, 1959     J. M. WILKINS     2,880,753
REGULATOR VALVE
Original Filed Sept. 9, 1952
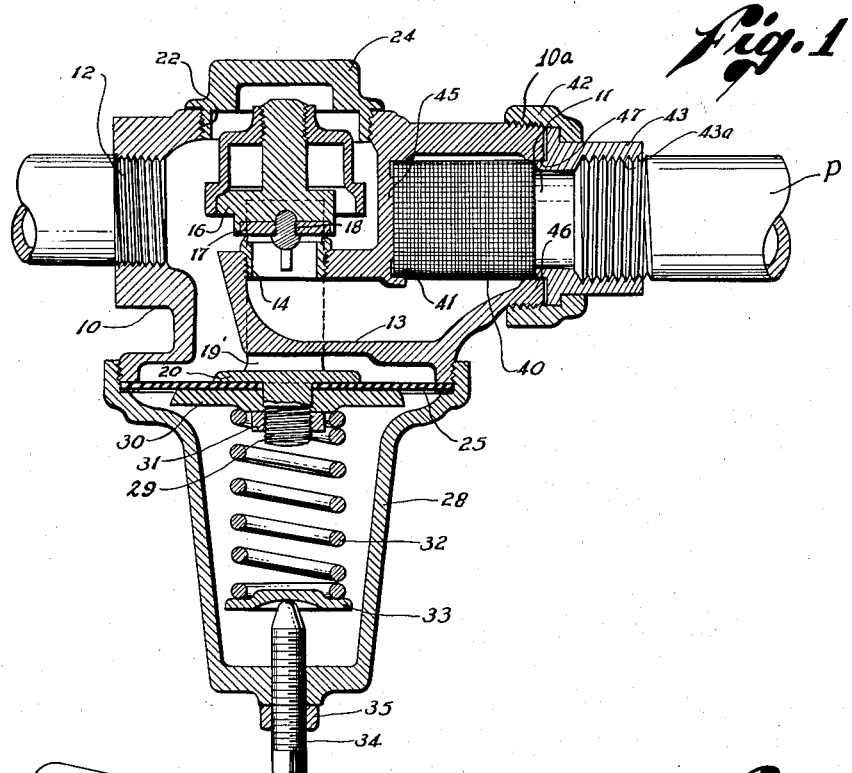
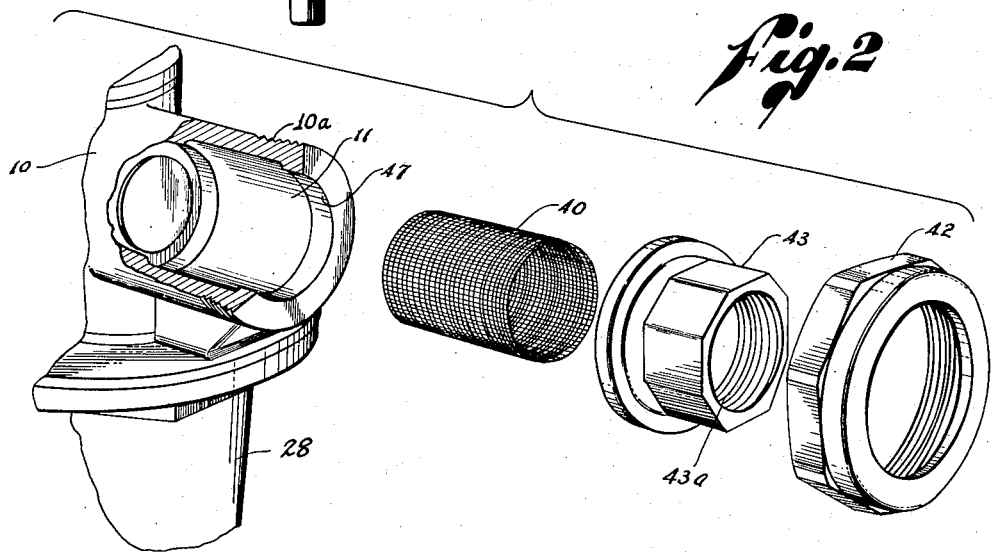
INVENTOR.
JAMES M. WILKINS
BY
ATTORNEYS

United States Patent Office 2,880,753
Patented Apr. 7, 1959

2,880,753

REGULATOR VALVE

James M. Wilkins, Los Angeles, Calif., assignor to Arthur H. Kaplan, Los Angeles, Calif.

Original application September 9, 1952, Serial No. 308,549, now Patent No. 2,737,975, dated March 13, 1956. Divided and this application July 5, 1955, Serial No. 519,759

5 Claims. (Cl. 137—549)

This is a division of my pending application Serial No. 308,549, filed by me September 9, 1952 and now Patent No. 2,737,975 issued March 13, 1956.

My present invention has for its object to provide an automatic pressure reducing and regulating valve and strainer in which said parts are combined in a unitary housing, the strainer being mounted in a novel manner, in a straight line with the flow with the fluid or gases, to reduce the friction created by fluids and gases passing through it. The foreign substance trapped by the screen, may be removed by simply disconnecting the union coupling nut at the inlet end of the regulator, thus eliminating the need for an extra tapping for the usual cleanout cap, and the supplying of such cleanout cap for removal of foregn substance and the screen.

A still further object of the invention, is to provide an automatic regulating valve and cylindrical strainer positioned in line to the inlet and adjacent to the valve regulating mechanism whereby the overall width of the casing as defined by the inlet and outlet ports is reduced to a minimum in the combined housing. This union end also eliminates the pipe union when installing the regulator in the pipe line. The union serves as a cleanout cap for the screen and foreign substances to be removed from the housing without disturbing any other member.

To these and other ends, my invention comprehends further improvements and simplification in construction, all as will be fully described in the accompanying specification, the novel features thereof being set forth in the appended claims.

Figure 1 is a central vertical sectional view of a regulator valve embodying my invention; and Figure 2 is an exploded view of a unique strainer unit incorporated in said valve.

Referring to the drawings by numbers, like numbers indicate like parts in the two views. 10 indicates the body portion of the regulator, having the straight open-ended chamber, from which lateral branches forming the inlet 11 and the outlet 12 extend, one of which branches, the inlet, as here shown, being provided with a nipple 13 projecting in the chamber of the body portion 10. The construction also provides union assembly nut 42 and tail piece 43. The tail piece 43 is internally threaded at 43ª to receive an inlet pipe P. The cylindrical screen used for the strainer 40 is recessed in the inlet 11 and is put in on a straight line to reduce friction. The left end of the cylindrical screen 40 is disposed within an annular groove 41 formed in a vertical partition wall 45 of the body 10. The tail piece 43 includes a retainer flange 46 which extends into the outlet bore 47 of the body. The thickness of the wall of body 10 at this point is greater than the axial length of the retainer flange 46, and a cylindrical seat is thereby provided for the right end of the screen 40. With this arrangement the screen will be retained securely in place once the assembly nut 42 is tightened upon threads 10ª formed on the body 10. The assembly of the strainer with union eliminates the necessity of a strainer cap and washer usually shown on other combined regulator and strainer assemblies. The nipple 13 is provided with a removable cylindrical valve seat member 14, preferably of the form shown. Seated upon the removable valve seat 14 is the valve head 16, preferably recessed on its lower face to receive a suitable valve disc 17 which may be fastened in place in any suitable manner, as by the centrally disposed binding screw 18. The said valve head 16 is carried by a yoke 19 rising from a base plate 20.

The portion of the body 10 above the yoke 19, will be provided with a cap 24 preferably threaded and gasketed to the body so as to give a tight joint. This cap 24 when removed, provides access to the valve side of the regulator for removal of the valve head 16 carrying the disc 17 from the yoke of valve seat 19 from its threaded bore 22 for the purpose of repair or replacement, and it will be seen that the needs of the valve side may be cared for simply by removing the cap and without the necessity of disturbing any of the rest of the apparatus.

The base plate 20 of the yoke 19 seats upon the upper surface of a diaphragm 25 secured to the lower end of the body above a spring housing 28. The base plate 20 preferably has a threaded stud 29, which passes through the diaphragm and through an abutment plate 30, a suitable nut 31 being provided to engage the threaded stud 29, and clamp the abutment plate against the diaphragm and hold it snugly to the base plate 20, as shown in Figure 1. The housing 28 will be elongated for purposes of receiving the spring 32 which, at its upper end bears against the abutment plate 30, and at its lower end engages an abutment disc 33, supported by an adjustment screw 34 threaded in the bottom of the housing 28, and having a lock nut 35. It will be seen that if the diaphragm side needs repair or replacement, it may be accomplished by simply unscrewing the housing 28, and that the valve side or the pipe line in which the regulator is installed need not be disturbed for any repairs that are needed on the diaphragm side. The above-described construction lends itself very readily to assembling, for the valve seat having been mounted in the nipple, the yoke and diaphragm will be assembled, and placed in the body 10 in proper relation to the nipple, and the spring housing will then be screwed to the body 10, with the parts assembled in the housing as shown; after which, and from the valve side, the valve head may be inserted in the yoke through the open top of the body 10, the cap 24 set up, and the diaphragm spring may then be adjusted to give the tension required for the pressure which is being handled.

The operation of the regulator will be obvious. The diaphragm spring having been set for the pressures to be handled, the opening and closing of the valve disc 17 will be automatic and quickly responsive to changes in pressure. In the form shown, outlet pressure from 12 controls the valve head 16, such outlet pressure being exerted on the upper surface of the diaphragm 25 so as to maintain the valve disc 17 closed against the pressure of the diaphragm spring 32, until reduction in pressure on the outlet side permits the spring to move the diaphragm, yoke, and valve head, whereupon the inlet pressure from 11 will flow through the nipple 13 until the pressure on the outlet side is again restored, and the valve will then automatically close.

Various modifications and changes may be made with respect to the foregoing description without departing from the spirit of the invention or the scope of the following claims.

I claim:

1. In a valve assembly the improvements comprising: a body formed at opposite ends with inlet and outlet openings substantially in axial alignment with each other;

a transverse partition wall formed in said body between said openings that is substantially normally disposed relative to the axes of said openings dividing the interior of said body into an upstream chamber communicating with said inlet and a downstream chamber communicating with said outlet, said partition wall on its upstream side having an annular groove coaxially aligned with said inlet; conduit means formed in said housing communicating said chambers through a passage offset from said partition wall; a tailpiece coaxially seated in said inlet opening and having means that cooperate with said inlet opening to define an annular seat coaxial to said inlet opening and to said annular groove of said partition wall, the end of said tailpiece remote from said inlet opening being formed with means for receiving an inlet pipe; external thread means formed on said body adjacent said inlet opening and coaxial therewith; an assembly nut coaxially encompassing said tailpiece and threadable onto said thread means for removably affixing said tailpiece to said body; and a cylindrical strainer removably disposed between said inlet opening and said partition wall with its opposite ends positioned within said annular seat and within said annular groove.

2. In a valve, the improvements comprising: a body formed with coaxially aligned inlet and outlet openings; a transverse partition wall formed in said body disposed normally to the axis of said openings and dividing the interior of said body into an upstream chamber of greater diameter than said inlet opening and communicating with said inlet, and a downstream chamber communicating with said outlet, said partition wall on its upstream side being formed with an annular groove coaxially aligned with said inlet opening; conduit means formed in said housing communicating said chambers through a passage offset from said wall and from said chambers; a tailpiece coaxially disposed adjacent said inlet opening and having an annular retainer flange which slidably extends into said opening for a distance less than the thickness of the body wall adjacent said opening so as to cooperate with said opening in defining an annular seat coaxial to said opening and to said annular groove; thread means formed on said body adjacent said inlet opening and coaxial therewith; a union assembly nut coaxially encompassing said tailpiece and threadable onto said thread means for removably affixing said tailpiece to said body; and a cylindrical strainer slidably insertable through said inlet to be disposed between said annular seat and said annular groove to define an annular space with said inlet chamber communicating with said conduit means.

3. In a valve assembly having inlet and outlet openings formed in opposite ends of a valve body, a strainer assembly and mounting means comprising in combination: an integral partition wall formed in said body and dividing said body into an upstream chamber communicating with said inlet and a downstream chamber communicating with said outlet, said wall on a side thereof confronting said inlet opening having an annular shoulder formed therein coaxially disposed with said inlet opening to provide a seat for one end of a cylindrical strainer; internal conduit means formed in said body offset from said wall and from said chambers by-passing said wall and providing communication between said chambers; a tail-piece adapted to have a predetermined length of one end seated in the exterior end portion of said inlet opening whereby the remainder of said inlet opening and the face of said one end of said tailpiece define an annular shoulder to provide a seat for an opposite end of a cylindrical strainer; a cylindrical strainer having a diameter complementary to that of said seats and an axial length equivalent to the spacing between said seats that is insertable through said inlet opening into supported position on said annular shoulder of said wall and on said inlet opening, said strainer having a diameter less than that of said inlet chamber to define with said inlet chamber an annular flow passage communicating with said conduit means; and means for removably affixing said tail-piece in seated position in said inlet opening to prevent axial displacement of said strainer.

4. A strainer assembly construction for a valve body comprising in combination: an integral partition wall formed in said valve body spaced apart from and confronting an inlet opening of said body and formed on the side thereof facing said inlet with an annular groove concentric with said inlet and adapted to receive therein one end of a cylindrical strainer; a cylindrical strainer having a diameter adapted for slidable insertion through said inlet opening to be seated at its inner end in said groove of said partition wall with its outer end seated in said inlet opening, said strainer being supported only at said seated ends thereof; a tail-piece formed with an annular axially extending flange adapted to be slidably received in said inlet opening an axial distance less than the axial length of said opening in shoulder-defining relationship with said opening to hold said strainer against displacement between said partition wall and said tailpiece; and a union assembly nut threadably engageable with said valve body and adapted to engage an external shoulder formed in said tail- piece to releasably hold said strainer and tail-piece in assembled relationship in said body.

5. A valve assembly construction for mounting a valve including a strainer assembly in a straight-run of pipe comprising in combination: a valve body formed with coaxial opposite inlet and outlet openings and an internal integral partition dividing the interior of said body into an outlet chamber and an inlet chamber and being formed with an internal conduit offset from said wall and from said chambers that is adapted to provide communication between said chambers, said partition being positioned normal to the common axis of said openings and being formed on the side thereof confronting said inlet with an annular shoulder of the same size as said inlet, and said inlet chamber having a diameter greater than the diameter of said shoulder and said inlet; a strainer comprising a cylindrical wall of a mesh material having a diameter complementary to that of said inlet and of said shoulder to be slidably insertable into said inlet chamber through said inlet opening to be positioned at its inner end in said shoulder, said strainer when abutting said partition having its outer end seated in said inlet opening, said strainer wall and the wall of said inlet chamber defining an annular passage communicating with said internal conduit; a tail-piece formed at one end with an annular axially extending flange adapted to be slidably received in said inlet opening an axial distance less than the axial length of said opening in shoulder-defining relationship with said opening whereby said strainer is held against displacement between said partition and said tail-piece; and a union assembly nut threadably engageable with said valve body and adapted to engage an external shoulder of said tail-piece to releasably hold said strainer and said tail-piece in assembled relationship in said straight-run of pipe with said inlet, outlet, and strainer being in coaxial relationship.

References Cited in the file of this patent

UNITED STATES PATENTS

| Number | Name | Date |
|---|---|---|
| 595,540 | Heithecker | Dec. 14, 1897 |
| 986,678 | Bordo | Mar. 14, 1911 |
| 1,159,431 | Swanstrom | Nov. 9, 1915 |
| 1,833,944 | Hull | Dec. 1, 1931 |
| 1,847,068 | Campbell | Mar. 1, 1932 |
| 2,152,781 | Wile | Apr. 4, 1939 |
| 2,519,805 | Wilkins | Aug. 22, 1950 |
| 2,639,194 | Wahlin | May 19, 1953 |
| 2,737,975 | Wilkins | Mar. 13, 1956 |

FOREIGN PATENTS

| Number | Country | Date |
|---|---|---|
| 609,101 | France | May 3, 1926 |